US007827286B1

(12) United States Patent
Deflaux et al.

(10) Patent No.: US 7,827,286 B1
(45) Date of Patent: Nov. 2, 2010

(54) PROVIDING ENHANCED ACCESS TO STORED DATA

(75) Inventors: Nicole A. Deflaux, Seattle, WA (US); Adam D. Bradley, Seattle, WA (US); Ranganath Atreya, Mercer Island, WA (US); Anand Chelian, Seattle, WA (US); Vidya V. Iyer, Seattle, WA (US); James C. Willeford, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 467 days.

(21) Appl. No.: 11/763,976

(22) Filed: Jun. 15, 2007

(51) Int. Cl.
*G06F 15/173* (2006.01)

(52) U.S. Cl. .................. 709/226; 709/215; 711/170; 718/100

(58) Field of Classification Search .......... 709/215, 709/203, 223, 226; 718/100, 104; 711/100, 711/170, 173
See application file for complete search history.

(56) References Cited

U.S. PATENT DOCUMENTS

| 5,535,322 | A * | 7/1996 | Hecht | 705/1 |
| 5,771,383 | A * | 6/1998 | Magee et al. | 719/312 |
| 6,941,341 | B2 * | 9/2005 | Logston et al. | 709/203 |
| 7,444,349 | B1 * | 10/2008 | Ochotta | 707/102 |
| 2004/0064814 | A1 * | 4/2004 | Bowers et al. | 718/100 |
| 2005/0097297 | A1 * | 5/2005 | Hoshina | 711/170 |
| 2007/0288938 | A1 * | 12/2007 | Zilavy et al. | 719/327 |
| 2008/0104595 | A1 * | 5/2008 | Kawachiya et al. | 718/100 |
| 2008/0177941 | A1 * | 7/2008 | Yim et al. | 711/170 |

OTHER PUBLICATIONS

Karger, D., et al., "Consistent Hashing and Random Trees: Distributed Caching Protocols for Relieving Hot Spots on the World Wide Web," STOC, 1997, retrieved Jun. 19, 2007, from http://citeseer.ist.psu.edu/cache/papers/cs/2895/ http:zSzzSztheory.lcs.mit.eduzSz~kargerzSzPaperszSzweb.pdf/karger97consistent.pdf, 10 pages.
"The Chord/DHash Project—Chord FAQ" retrieved Jul. 17, 2007, from http://pdos.csail.mit.edu/chord/faq.html, 4 pages.

(Continued)

*Primary Examiner*—Ramy M Osman
(74) *Attorney, Agent, or Firm*—Seed IP Law Group PLLC

(57) ABSTRACT

Techniques are described for providing enhanced access to stored data and related functionality, such as data stored by a system across multiple alternative storage partitions. At least some of the stored data may be specific to particular users who interact with the system, such as for users to perform tasks supplied by other users. The enhanced data access techniques may include storing at least a subset of each user's associated data on a single storage partition, and then efficiently identifying the storage partition corresponding to a user so that requests from that user may be handled by a computing node associated with that corresponding storage partition. Furthermore, additional data access enhancement techniques may relate to initially identifying an appropriate storage partition for a user and/or for migrating existing user data to a new partition identified as being appropriate for a user.

39 Claims, 4 Drawing Sheets

OTHER PUBLICATIONS

"The Chord/DHash Project—Overview" retrieved Jul. 17, 2007, from http://pdos.csail.mit.edu/chord/, 1 page.

"What is an Entity Bean?" The J2EE™ Tutorial, retrieved Jul. 17, 2007, from http://java.sun.com/j2ee/tutorial/1_3-fcs/doc/EJBConcepts4.html, 4 pages.

Carbonado, homepage, retrieved Jul. 17, 2007, from http://carbonado.sourceforge.net, 3 pages.

Cecchet, E., et al., "C-JDBC: Flexible Database Clustering Middleware," Mar. 2005, ObjectWeb, retrieved Jul. 17, 2007, from http://c-jdbc.objectweb.org/current/doc/C-JDBC_Flexible_Database_Clustering_Middleware.pdf, 10 pages.

Chen, P., "The Entity-Relationship Model—Toward a Unified View of Data," Mar. 1976, *ACM Transactions on Database Systems* 1(1):9-36, retrieved Jul. 17, 2007, from http://bit.csc.lsu.edu/~chen/pdf/erd.pdf, 28 pages.

Hibernate.org, Relational Persistence for Java and .NET, retrieved Jul. 17, 2007, from http://www.hibernate.org/, 3 pages.

Hibernate.org, Product Evaluation FAQ, retrieved Jul. 17, 2007, from http://www.hibernate.org/263.html, 4 pages.

JBoss.com, "Object and Relational Mapping (ORM) with Hibernate," retrieved Jul. 17, 2007, from http://www.jboss.com/pdf/HibernateBrochure-Jun2005.pdf, 4 pages.

ObjectWeb.org, Homepage, retrieved Jul. 17, 2007, from http://c-jdbc.objectweb.org/, 2 pages.

ObjectWeb.org, "C-JDBC: Scalability and High Availability for your Database," Jan. 2006, retrieved Jul. 17, 2007, from http://c-jdbc.objectweb.org/current/doc/C-JDBC-Brochure-EN.pdf, 2 pages.

ObjectWeb.org, How does it work?, , retrieved Jul. 17, 2007, from http://c-jdbc.objectweb.org/howdoesitwork.html, 1 page.

Wikipedia, "Object-relational Mapping," retrieved Jul. 17, 2007, from http://en.wikipedia.org/wiki/Object-relational_mapping, 4 pages.

* cited by examiner

PROVIDING ENHANCED ACCESS TO STORED DATA

TECHNICAL FIELD

The following disclosure relates generally to providing enhanced access to groups of data stored across multiple alternative storage partitions.

BACKGROUND

As the use of the Internet and the World Wide Web ("Web") has become widespread, it is increasingly common for users to access and use various types of capabilities provided by remote computing systems over the Web, including to search for, shop for and order items (such as products, services and/or information) that are for purchase, rent, lease, license, trade, evaluation, sampling, subscription to, etc. In addition to such user-initiated interactions, software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

While capabilities provided to remote users and other clients provide various benefits, various problems also exist. For example, as the scale of such offerings increases (e.g., to support large numbers of clients), large numbers of computing devices may be needed to store data related to the clients and/or to handle requests from and other interactions with the clients. However, among other potential issues, it can be difficult to coordinate the various computing devices in order to provide efficient capabilities without significant overhead.

DETAILED DESCRIPTION

Techniques are described for, among other things, providing enhanced access to stored data and related functionality, such as data stored by a system across multiple alternative storage partitions or other data stores. In at least some embodiments, the system storing the data may provide functionality to multiple remote users of one or more types, and if so at least some of the stored data may be specific to particular users, such as to reflect prior interactions with those users. As one example, in at least some embodiments, the system storing the data may be a task exchange system that serves as an intermediary to facilitate performance by some users of tasks supplied by other users, as discussed in greater detail below. The enhanced data access techniques may include storing at least a subset of each user's associated data on a single storage partition, and then providing a mechanism to efficiently identify the storage partition corresponding to a user so that requests from that user may be handled by a computing node associated with that corresponding storage partition. Furthermore, additional data access enhancement techniques may include techniques for initially identifying an appropriate storage partition for a user and/or for migrating existing user data to a new partition identified as being appropriate for a user, such as based on information about the user and/or about the identified partition. Additional details related to the data access enhancement techniques are included below.

Figure 1:
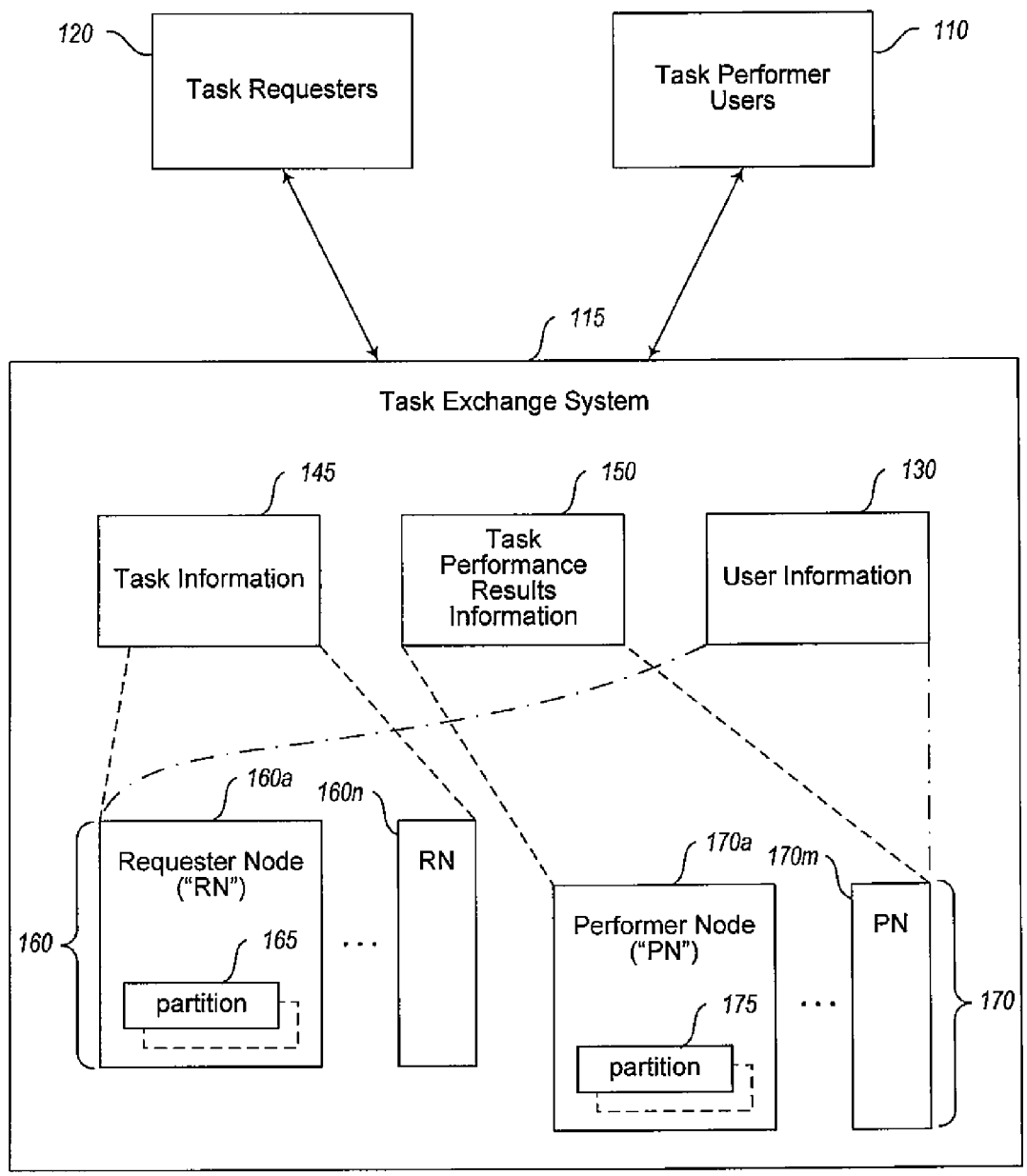
FIG. 1 is a network diagram illustrating an example of users interacting with a remote system that stores various data and provides various types of functionality.

FIG. 1 is a network diagram that illustrates an example of users interacting with a remote system that stores various data and provides various types of functionality, with embodiments of such a system able to use various of the described data access enhancement techniques. In particular, in this example embodiment, the system storing the data is a task exchange system 115 that stores data related to tasks and to users who supply and/or perform the tasks, and that provides functionality related to performance of tasks. For illustrative purposes, some embodiments are described herein in which specific types of users interact with specific types of systems in specific ways, and in which the systems store specific types of data and provide specific types of related functionality, including specific types of data access enhancement techniques. These examples are provided for illustrative purposes and are simplified for the sake of brevity, and the inventive techniques can be used in a wide variety of other situations, some of which are discussed herein.

The task exchange system 115 may be implemented in various ways in various embodiments, such as with a software system executing on one or more computing systems or devices (e.g., in a distributed manner, such as on a peer-to-peer or grid network). In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the system 115 may enable the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

In the example of FIG. 1, various task requesters 120 interact with the task exchange system 115 (e.g., by sending requests to the system 115 and receiving corresponding responses as appropriate) in order to supply tasks that are available to be performed by others, as well as to perform other related activities. For example, in addition to supplying tasks, a task requester may interact with the system 115 to obtain results from the performance by other users of previously supplied tasks, to obtain information about an account of the task requester (e.g., information about financial payments made to other users for performing tasks supplied by the task requester, information about previously specified preferences, etc.), to search for information about tasks and/or about users who are available to perform tasks, to specify types of qualifications that users may need to perform supplied tasks, etc. The task requesters 120 may take various forms, such as a task requester user who interactively accesses the system 115 (e.g., via a GUI, or graphical user interface, displayed on a computing system of the task requester user, not shown, such as a GUI based on Web pages provided by the system 115 and/or based on execution of a client-side application on the computing system), or a software application that is programmatically interacting with the system 115 (e.g., via an API of the system 115, not shown) on behalf of a related task requester user.

When a task requester supplies information about one or more tasks, the system 115 stores the task-related data as part of task information 145, which may then be made available to other users to perform the tasks in a manner specified by the task requester or otherwise determined by the system 115. The supplied information for a task may include a variety of types of information, including details related to the task (e.g., information to be analyzed, a question to be answered, etc.), one or more qualifications of any task performer user who performs the task, one or more geographical locations associated with the task, one or more capabilities and/or other current characteristics of one or more devices to be used as part of performing the task, one or more other criteria related to task performance (e.g., deadlines for completion, format of results from task performance, etc.), one or more associated rewards (e.g., monetary payments) to be provided to one or more task performer users who successfully perform the task, etc.

The system 115 stores various data across multiple alternative storage partitions in this example embodiment, such that at least some types of data are stored only on a single partition. In particular, in this example embodiment, the system 115 organizes data based on users with which the data is currently associated, so as to store a group of data related to a particular user together on a particular storage partition. Thus, for example, when a particular task requester user supplies information about a new task, the system 115 determines an appropriate storage partition to store the information about the new task along with other information related to the task requester user, as discussed in greater detail below. In this example, the system 115 includes various alternative computing nodes 160 that store data related to task requester users, including example requester computing nodes 160a and 160n. As illustrated in detail with respect to requester node 160a, each requester node may include one or more storage partitions 165 that each store data related to one or more task requester users. Accordingly, in this example embodiment, the system 115 determines a particular storage partition on one of the requester nodes that corresponds to the particular task requester that supplied information about the new task, such as a first partition 165 on requester node 160a. Furthermore, in this illustrated embodiment, the computing node associated with a storage partition corresponding to a task requester user not only provides storage of data related to the task requester user, but also provides at least some of the system 115 functionality for the task requester user via an executing software program (not shown), such as to process and respond to various types of requests received from the task requester user.

The computing nodes may have various forms in various embodiments, such as with one or more of the computing nodes each being a distinct physical computing system, each being one of one or more virtual machines that are each hosted on a physical computing system, each including multiple physical computing systems working in concert, etc. In some embodiments in which multiple virtual machines or multiple physical computing systems support a single computing node, a single one of the virtual machines or physical computing systems may be selected to perform a particular computation or otherwise provide a particular piece of functionality, while in other such embodiments some or all of the multiple virtual machines or physical computing systems may duplicate some pieces of functionality (e.g., to provide fault tolerance). Furthermore, in at least some embodiments in which multiple virtual machines or multiple physical computing systems support a single computing node, one of the virtual machines or physical computing systems may act as a master system that is the primary system to control data and/or interactions for the computing node, and the other virtual machines or physical computing systems may act as slaves that operate under control. In addition, in some embodiments, storage partitions may have other forms, such as with one or more storage partitions each being subdivided and/or duplicated across multiple physical computing systems, each being subdivided and/or duplicated across multiple virtual machines, each being stored on dedicated storage devices that do not themselves provide additional computing capabilities, etc. Providing multiple alternative computing nodes and storage partitions may provide various benefits in various situations, such as specialization of functionality (e.g., in embodiments in which requester nodes are distinct from performer nodes, or in which some computing nodes have differentiated hardware or capabilities), failure isolation (e.g., so that failure of a particular computing node will only affect a limited subset of users that are associated with that computing node), etc.

An appropriate storage node for a particular task requester user may be determined in various ways in various embodiments, such as in a dynamic manner at a time of an interaction with the task requester user (e.g., in response to a request from the task requester user or other interaction with the task requester user). For example, if the task requester is an existing user who already has information stored in a particular storage partition on a particular computing node, the system 115 may merely select that existing storage partition. In order to facilitate a rapid determination of such existing associated storage partitions, in at least some embodiments the system 115 may maintain a lookup table in memory or other mapping that maps information associated with a user (e.g., a user login name, unique user identifier, etc.) to a particular storage partition and/or computing node (e.g., to a unique partition identifier and/or node identifier). If so, the system 115 may determine the storage partition for a user by merely retrieving the information from the mapping. In addition, in at least some embodiments the lookup table or other mapping may be implemented in other manners, such as in a database or otherwise on storage, in memory but with one or more backup copies of the in-memory data in a database or otherwise on storage (e.g., so that backup copies may be used if the in-memory data becomes temporarily unavailable, and/or to maintain a permanent copy of the in-memory data), etc. Furthermore, in at least some embodiments, the lookup table or other mapping is beneficially implemented in such a manner as to provide high-availability, so as to efficiently handle requests from and other interactions with users.

If the task requester user is a new user (or otherwise does not currently have an existing associated storage partition), the system 115 may determine an appropriate storage partition for the user in various ways. For example, the system 115 may consider information about possible storage partitions, such as to determine storage partitions that have sufficient storage capacity to store data expected for the user (e.g., to select an under-utilized or newly available storage partition), to determine storage partitions whose associated computing nodes have sufficient resources other than storage to handle providing functionality to the user (e.g., sufficient memory, CPU cycles, and bandwidth for I/O, or "input/output," operations), to determine storage partitions whose associated computing nodes have enhanced resources relative to other computing nodes (e.g., for premium users who pay for higher quality-of-service capabilities and/or reliability, or who are otherwise selected to receive enhanced capabilities), etc. In addition to or instead of information about the storage partitions, the system 115 may also consider various types of information about the new user if such information is available (e.g., an amount of storage and/or other resources expected to be used by the user, such as based on explicitly supplied information from the user and/or similarities of the user to other known users; whether the user is a premium user who has paid for or is otherwise selected to received enhanced capabilities; etc.) and/or information about other users that are related to the user if such information is available, such that the system 115 may desire to store the user's data on the same or proximate storage partitions as used for the related user (e.g., other task requester users who supply similar types of tasks as those expected from the user; task performer users who have an affinity for performing tasks similar to those expected from the user; other users who have differing and complementary usage patterns relative to those expected from the user, such as to have usage patterns with intensive data access or other I/O operations paired with other usage patterns that make intensive use of the CPU; etc.). Various other types of information may similarly be used in other embodiments when determining an appropriate storage partition for a new user. After an appropriate storage partition is determined for a new user, the lookup table or other mapping is updated to reflect the association between the new user and the determined storage partition.

Thus, when a task requester user supplies information about a new task, the task-related information is in this example embodiment stored together on a single storage partition with at least some other information specific to the task requester user. In this example, the various task information 145 for the system 115 is stored in a distributed manner across the partitions 165 of the requester nodes 160, although in other embodiments such task information may be associated with other users in at least some situations (e.g., to temporarily associate information about a task with a task performer user while the task performer user is performing the task).

As previously noted, various types of information other than about supplied tasks may also be associated with task requester users and grouped together on storage, including various administrative information (e.g., contact information, payment-related information, previously specified user preferences, etc.) and information about previous interactions with the user. Such user information may be supplied by the user and/or generated by the system 115, and is stored as user information 130 by the system 115 in this example. As is illustrated, such user information may be stored by the requester nodes 160 when the user information corresponds to task requester users, but may additionally be stored on task performer computing nodes 170 when the user information corresponds to task performer users. In a manner similar to the requester nodes 160, the system 115 includes various alternative task performer nodes 170 in this example, including performer nodes 170a and 170m. As illustrated in detail with respect to performer node 170a, each performer node may include one or more storage partitions 175 that each store data related to one or more task performer users.

Thus, when a task performer user 110 submits a request to or otherwise interacts with the system 115, the interaction is handled in a manner similar to that previously described with respect to the task requester users 120. The interaction may be, for example, to initiate performance of a specified task that is supplied by a task requester user, to obtain information about an account of the task performer (e.g., information about financial payments received from other users for performing tasks supplied by those other users, information about previously specified preferences, etc.), to search for information about tasks and/or about other users, to provide information about qualifications of the task performer user that may assist in performing various types of supplied tasks, etc. The task performer users 110 may interact with the system 115 in various ways, such as via a GUI of the system 115 that is displayed on computing devices (not shown) of the task performer user. In addition, task performer users and task requester users may search for or otherwise discover information of interest (e.g., about tasks, about other users, etc.) in various ways in various embodiments, such as via a centralized search directory, in a distributed manner by various computing nodes pushing data to and/or pulling data from some or all other computing nodes, etc.

As with requests from or other interactions by task requesters, after receiving a request from a particular task performer user, the system 115 determines an appropriate storage partition for the task performer user on one of the performer nodes 170, such as a first partition 175 on performer node 170a. For existing task performer users, a storage partition that already stores data for the task performer user may be quickly determined via retrieval of information from a lookup table or other mapping that maintains information about such associations. For new task performer users, an appropriate storage partition may be selected in a manner similar to that previously discussed for task requester users, such as based on information about the possible storage partitions, about the new user if such information is available, and/or about other users that are related to the user if such information is available. As one specific example, if information is available about types of tasks that the new task performer user has an affinity for performing, the system 115 may desire to store the new user's data on a storage partition that is proximate to one or more storage partitions that store data for task requester users who supply tasks of those types. Moreover, in embodiments in which at least some nodes may act as both requester nodes and performer nodes (or in which distinctions are not made between requester nodes and performer node, such that there is merely a group of computing nodes that may each store requester-related and/or performer-related data), the data for the new task performer user may be co-located on a particular storage partition with the data for one or more related task requester users who supply types of tasks for which the task performer user has an affinity.

After determining the appropriate storage partition for the task performer user, the system 115 transfers control of handling the task performer user's interaction to the computing node associated with the storage partition. For example, if the interaction is a request by the task performer user to perform a specified task supplied by a task requester user, the computing node associated with the task performer user's storage partition may interact with the computing node associated with that task requester user's storage partition to retrieve information about the task to be performed, such as under control of a software program (not shown) that is executing on the computing node associated with the task performer user's storage partition in order to provide some of the functionality of the system 115. In so doing, in some embodiments, the task information may be temporarily associated with the task performer user's storage partition while the task is being performed, while in other embodiments the task information may remain associated with the task requester user's storage partition but otherwise provide access to the information for the task performer user. After the task performer user performs the task (which may involve the task performer user supplying information and/or performing offline activities external to the system 115 and the task performer user's computing device), information about the results of the task performance are stored in the task performance user's storage partition, and may be made available to the task requester user in various ways (e.g., by automatically forwarding them to the task requester, supplying them to the task requester when the task requester user requests them, etc.). The aggregate task performance results information from the various task performer users then provides the task performance results information 150 for the system 115.

Thus, the example system 115 stores various types of data and provides various types of functionality to users, which in this example embodiment are task performer users and task requester users acting as clients of the system 115. Moreover, the system 115 may use various techniques to provide enhanced data access in at least some situations. As one example, by maintaining a lookup table or other related mapping that associates users with related storage partitions, the storage partition information for a user may be quickly and easily determined. Furthermore, the use of such a lookup table or other related mapping provides additional benefits that enable enhanced data access. For example, in contrast to partitioning schemes that always provide the same fixed deterministic partition response for a particular user (e.g., based on consistent hashing, static partitions, etc.), the use of a lookup table or other related mapping allows any storage partition to be initially selected for a user (since the user may be mapped to any partition), thus enabling the storage partition for a user to be selected based on any defined set of one or more criteria. Furthermore, after a particular storage partition has been selected for a user and stored in the lookup table or other mapping, the user-to-partition mapping may be changed at any time, thus allowing users' data to be migrated or otherwise transferred from a current storage partition to a new storage partition if the new storage partition is determined to be more appropriate for the user and/or the system 115, as discussed in greater detail below. In addition, new computing nodes and storage partitions may be easily added and integrated into the system 115 (e.g., to provide increased capacity and/or to replace computing nodes to be retired), and existing computing nodes and storage partitions may be easily removed from the system. Furthermore, in some embodiments the partition identifiers in the lookup table or other mapping may be logical identifiers, and the determining of a particular partition for a user may further include resolving the logical identifier to determine a particular physical partition to which the logical identifier corresponds.

As noted, in at least some embodiments, determinations may be made in various ways to migrate or otherwise transfer a user's data from a current storage partition to a new storage partition. The determination to initiate such a user data migration may be made in various ways in various embodiments. For example, in some embodiments a migration of a user's data may be initiated by the user (e.g., to request an enhanced level of services or capabilities, such as for a fee) or manually by an operator of the system 115. In addition, in some embodiments at least some such user data migrations may be automatically initiated by the system 115, such as enhance operation of the system 115. For example, the system may monitor performance of the system, including the current storage partitions and associated computing nodes, and may initiate user data migrations to enhance system performance. The performance monitoring may include monitoring measurements of the computing nodes' performance (e.g., levels of usage of memory, storage, network bandwidth, I/O access, etc.), such as to identify computing nodes that are over-utilized or under-utilized in one or more areas. If areas of over-utilization and/or under-utilization are detected, they may be corrected in various ways. As one example, users with similar usage patterns may be grouped together, such as to group users with CPU-intensive or memory-intensive usage patterns on computing nodes that have enhanced capabilities in those areas. As another example, users with complementary usage patterns may be grouped together, such as to group a first user with a CPU-intensive usage pattern with a second user with an I/O access-intensive usage pattern, so that different users are consuming different resources of a single computing node. Moreover, users may be grouped in a variety of other ways, such as to match users with differing usage patterns based on time-of-day, day-of-week, etc. In addition to grouping users based merely on usage patterns and on resource capabilities of computing nodes, various other factors may be considered in at least some embodiments when determining whether to migrate a user's data from a current storage partition to a new storage partition. As one example, some embodiments may provide differentiated capabilities, such as different levels of quality-of-service or different types of capabilities on different computing nodes (e.g., for a fee), and may migrate users to and from such differentiated computing nodes in response to, for example, user requests.

Furthermore, in at least some embodiments, users may be grouped based on types of activities of the users with the system 115, such as types of data that the users access. For example, task performer users may be grouped together based on types of tasks that they are expected to perform, so that information about the availability of such tasks may be made available to a group of one or more computing nodes whose storage partitions store data for such users. Similarly, task requester users who supply similar types of tasks may be grouped together for similar reasons. Alternatively, one or more task performer users who have an affinity for a particular type of task may be grouped together with one or more task requester users who supply such tasks, so that a single computing node may include data on one or more storage partitions about available tasks and for task performer users who will perform such tasks, thus minimizing the need to transfer task-related data between computing nodes and optionally providing preferred access to such task data to those task performer users.

More generally, in at least some embodiments, the system 115 uses one or more fitness functions that may each consider a variety of factors together when selecting an appropriate storage partition for a user, such as in a weighted manner such that some factors carry more weight than other factors. In such embodiments, each available storage partition may be given a score by the fitness function, with the highest score being determined to be the most appropriate storage partition for a user. Various factors may be considered in various embodiments, such as, for an existing task performer user, types of completed work, quantity of completed work, qualifications assigned to the user, user affinity for types of tasks and interests in various types of system 115 functionality (whether expressed by the user or derived from the user's activities, such as from searches, requests for notification about specified types of events of interest, purchase history for particular types of items from an e-commerce retailer, etc.), geographical location of the user, speed of the user in performing tasks, usage patterns related to when the user typically performs system interactions, etc. Factors for a task requester user may be similar, and may include factors such as volume of tasks supplied, types of tasks supplied, characteristics of tasks supplied (e.g., I/O-intensive work versus CPU-intensive work, amounts of storage needed, etc.), geographical location, expected amounts of future work to be supplied, etc.

The ability to migrate user data and efficiently determine a current storage partition for a user provides a variety of benefits. As one example, in at least some embodiments some types of users may be allowed to anonymously interact with the system 115 for a period of time, but then later login so that previously stored data for the user may be accessed. If so, an existing task performer user may, for example, anonymously interact with the system 115 to perform one or more tasks, and if so may be temporarily assigned to a storage partition during such interactions. If the anonymous user then subsequently logs in or otherwise provides identifying information, the system 115 may migrate that user's ongoing interactions to the computing node for the user's regular storage partition that stores the user's prior data, and may optionally transfer the data for the anonymous interactions from the temporary storage partition to the user's regular storage partition. More generally, the ability to migrate user data in the manners described enables efficient use of the hardware resources (e.g., by increasing use of under-utilized resources, by balancing complementary types of uses on a single computing node, etc.), and provides improved user experiences (e.g., by improving latency and throughput, such as by co-locating users with similar users or with users who access similar data). In addition, the ability to migrate user data in the manners described enables the provision of differentiated services, by enabling users to be migrated between computing nodes that provide different types of services or capabilities as desired.

In this example embodiment, the enhanced data access techniques are provided by a task exchange system. By enabling large numbers of unaffiliated or otherwise unrelated task requesters and task performers to interact via the intermediary task exchange system in this manner, free-market mechanisms may be used to efficiently perform tasks with location-based and/or device-based criteria regarding task performance. Additional details related to examples of interactions of users with particular embodiments of task exchange systems are included in pending commonly-owned U.S. patent application Ser. No. 10/990,949, filed Nov. 16, 2004 and entitled "Providing an Electronic Marketplace to Facilitate Human Performance of Programmatically Submitted Tasks," and in pending commonly-owned U.S. patent application Ser. No. 11/396,286, filed Mar. 31, 2006 and entitled "Facilitating Content Generation Via Messaging System Interactions," each of which is incorporated herein by reference in its entirety.

In addition, while not illustrated in FIG. 1, in at least some embodiments some or all of the computing nodes 160 and 170 and/or other computing systems (not shown) that implement the system 115 may be part of a group of related physical computing systems, such as multiple computing systems that are part of a program execution service for executing multiple programs on behalf of multiple users of the service. Such a program execution service may use multiple computing systems on multiple physical networks (e.g., multiple physical computing systems and networks within a data center) in order to execute third-party customers' programs, including multiple virtual machine nodes on at least some of the computing systems that are each able to execute one or more programs for a customer. In such embodiments, customers may provide programs to be executed to the execution service, and may reserve execution time and other resources on physical or virtual hardware facilities provided by the execution service. In addition, customers may define virtual networks that will be used by the program execution service, so as to transparently provide computing nodes of the virtual network with the appearance of operating on a dedicated physical network. Additional details related to the operation of example embodiments of a program execution service with which the described techniques may be used are available in U.S. application Ser. No. 11/394,595, filed Mar. 31, 2006 and entitled "Managing Communications Between Computing Nodes;" in U.S. application Ser. No. 11/395,463, filed Mar. 31, 2006 and entitled "Managing Execution of Programs by Multiple Computing Systems;" and in U.S. application Ser. No. 11/692,038 filed Mar. 27, 2007 and entitled "Configuring Intercommunications Between Computing Nodes;" each of which is incorporated herein by reference in its entirety.

Figure 2:
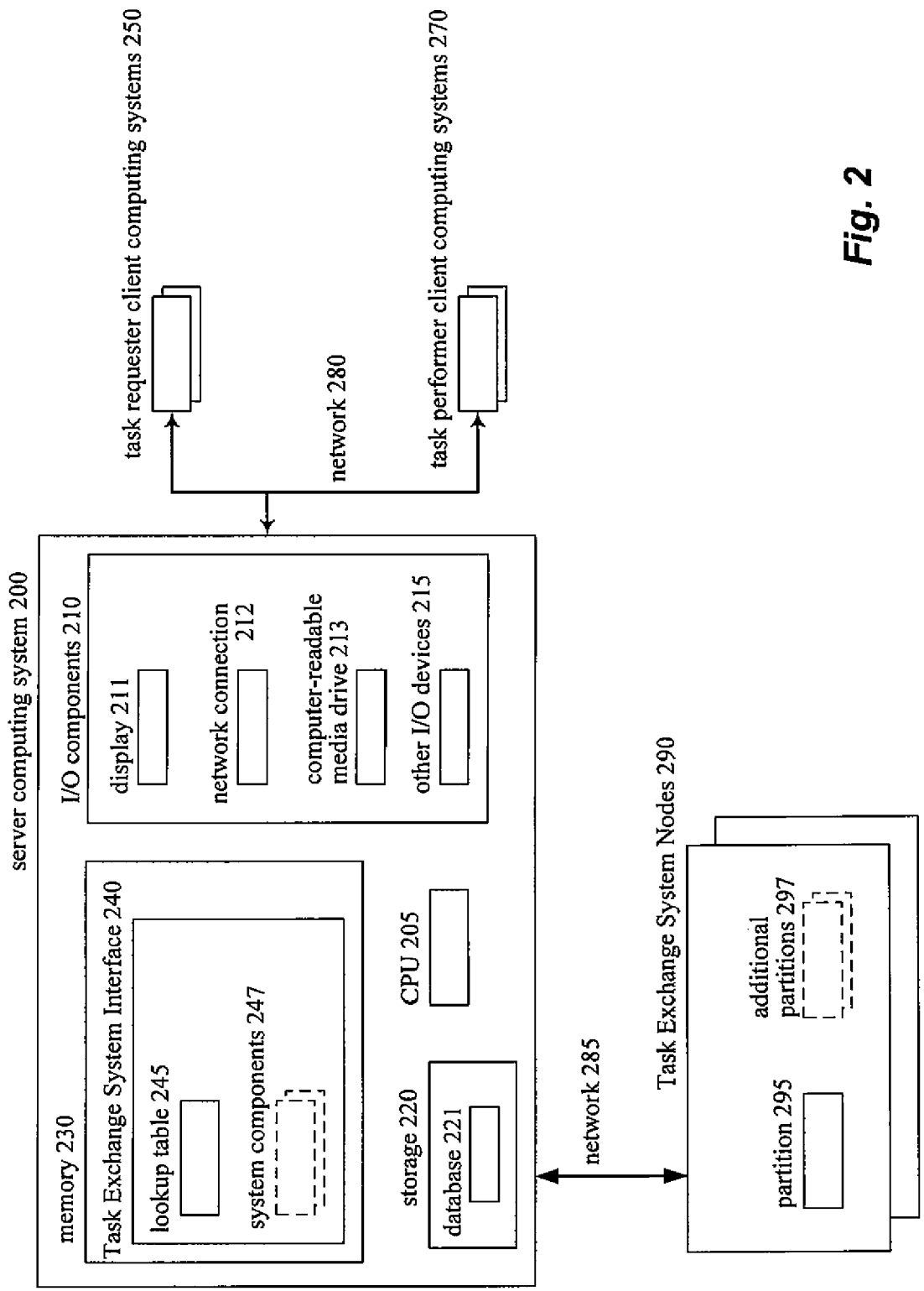
FIG. 2 is a block diagram illustrating an example computing system suitable for executing an embodiment of a system for providing enhanced access to stored data.

FIG. 2 is a block diagram illustrating example computing systems suitable for performing techniques for providing enhanced access to stored data in various situations. In particular, FIG. 2 illustrates a server computing system 200 suitable for executing an embodiment of an interface to a task exchange system, as well as various task requester client computing systems 250, task performer client computing systems 270, and other computing nodes 290 that support the task exchange system. In the illustrated embodiment, the server computing system 200 has components that include a CPU 205, various I/O components 210, storage 220, and memory 230. The I/O components include a display 211, a network connection 212, a computer-readable media drive 213, and other I/O devices 215 (e.g., a mouse, keyboard, etc.). The other computing systems 250 and 270 and the computing nodes 290 each may include similar components to those of the server computing system, but are not illustrated in detail here.

An embodiment of an interface portion of a task exchange system 240 is executing in memory, and it interacts with the client computing systems 250 and 270 over a network 280 using the network connection 212 (e.g., via the Internet and/or the World Wide Web, cellular network, etc.). In particular, users of task requester client computing systems 250 may interact with the system interface 240 in order to provide information about available tasks to be performed, as well as to perform other related interactions. Similarly, task performer users may use task performer computing systems 270 to interact with the system interface 240 to obtain information about available tasks and provide task performance results information, as well as to perform other related interactions.

As previously described, for at least some interactions initiated by the client computing systems 250 and 270, the system interface 240 responds by identifying an appropriate storage partition for a user associated with the interaction, and then directs a computing node associated with that storage partition to handle the interaction. In particular, in this example, the server computing system 200 is connected to multiple task exchange system alternative computing nodes 290 via another network 285 (e.g., a network internal to the task exchange system, such as if the computing nodes 290 are not directly accessible to external computing systems such as computing systems 250 and 270). Each of the alternative computing nodes 290 is capable of providing the same types of functionality in this example embodiment (e.g., capable of handling the same types of user requests), and each includes at least one storage partition 295 and optionally one or more additional storage partitions 297. For existing users, the system interface 240 uses a lookup table 245 to identify a particular storage partition for the user, and directs the user's request to the computing node that provides that storage partition. For new users or other users for which an existing storage partition is not available, the system interface 240 determines an appropriate storage partition as discussed in greater detail elsewhere, and directs the user's request to the computing node that provides that storage partition. While not illustrated here, in some embodiments the computing nodes 290 may instead be of varying types (e.g., separated into requester nodes and performer nodes, such as to support different types of functionality corresponding to those types of users; separated by offering different types or levels of capabilities, such as if some computing nodes support higher levels of quality of service and/or include additional capabilities for use by premium customers; etc.).

In addition, in at least some embodiments and for some types of interactions, the system interface 240 may directly handle the interactions without directing the interactions to particular computing nodes. For example, the task exchange system may maintain some types of data in a general data store that is not distributed among the computing nodes 290, such as in a database 221 on storage 220. If so, the system interface 240 may respond to requests to access or change such data directly without using the computing nodes 290. In other embodiments, such general data may not be maintained and used. Furthermore, in some embodiments, the system interface 240 and/or other portions of the task exchange system may optionally be separated into multiple components 247 that each provide one or more distinct types of functionality, although particular such components are not illustrated in this example embodiment.

Those skilled in the art will appreciate that computing systems and nodes 200, 250, 270 and 290 are merely illustrative and are not intended to limit the scope of embodiments of the present disclosure. The task exchange system may instead be executed by multiple interacting computing systems or devices, and computing system 200 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange system may in some embodiments be provided via various components, and may be combined in fewer components or distributed in additional components than is described herein. Similarly, in some embodiments, the functionality of some of the components may not be provided as part of the task exchange system and/or other additional functionality may be available.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 3:
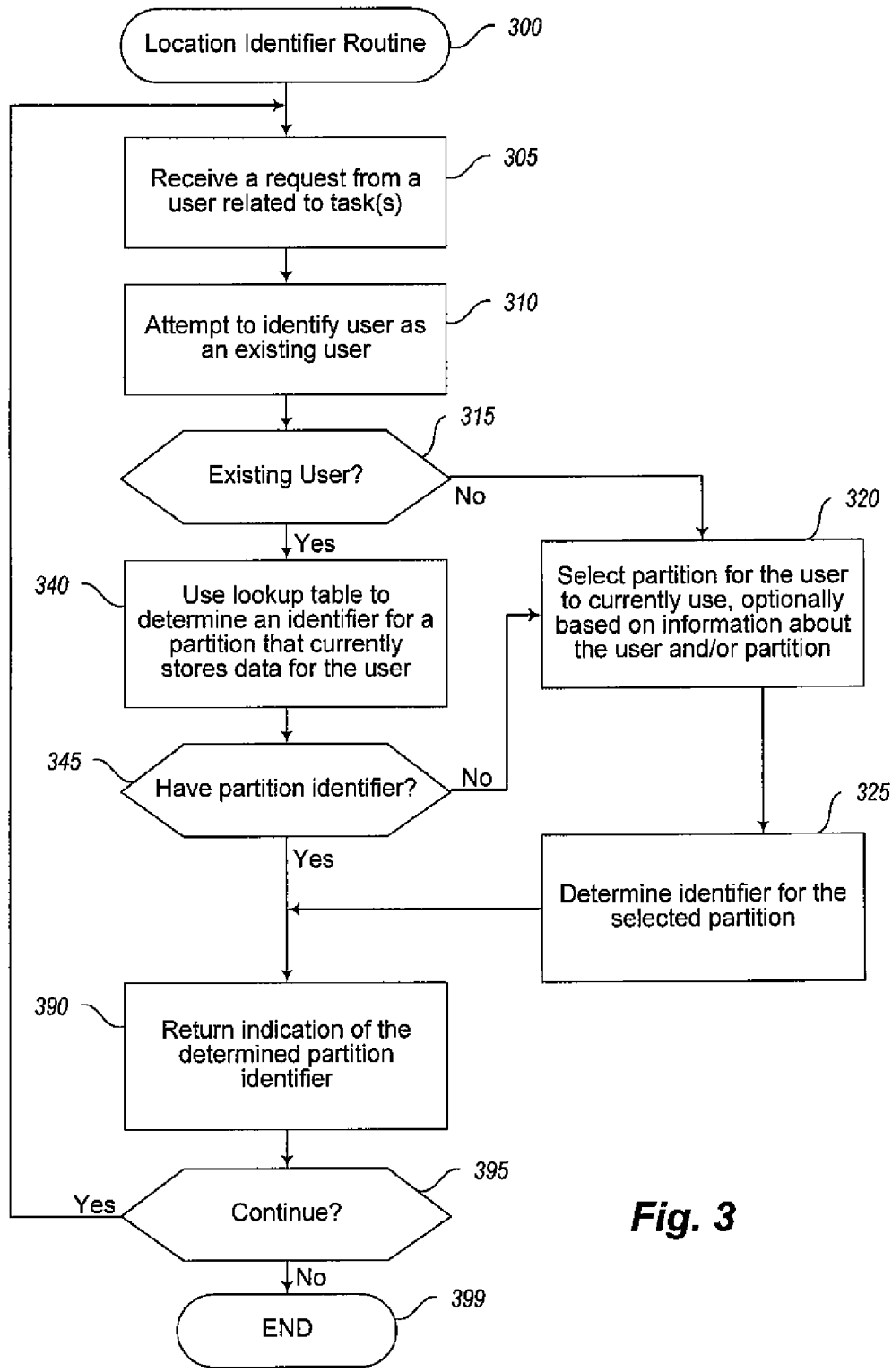
FIG. 3 illustrates a flow diagram of an example embodiment of a Location Identifier routine.

FIG. 3 is a flow diagram of an example embodiment of a Location Identifier routine 300. The routine may be provided by, for example, execution of a location identifier component of the task exchange system 115 of FIG. 1 and/or of the task exchange system interface 240 of FIG. 2, such as to identify a storage partition or other location on which data of interest is stored.

The illustrated embodiment of the routine 300 begins at block 305, where an indication is received of a request by or other interaction with a user related to performance of tasks via a task exchange system, such as to supply a task to be performed, to initiate performance of a task, or to perform another activity related to functionality of the task exchange system. The routine continues to block 310 to attempt to identify whether the user is an existing user who already has stored data, such as based on whether the user has supplied a login name or has another associated user identifier. If it is determined in block 315 that the user is not such an existing user, such as if the user is new or is performing an anonymous interaction, the routine continues to block 320 to select a storage partition for the user to currently use. As discussed in greater detail elsewhere, the determination may optionally be made based on information about the user and/or about the storage partitions (e.g., based on a specified fitness function that considers multiple factors), or instead in some embodiments may merely select the next available storage partition, and may in some embodiments may be made so as to provide differentiated types of services or response handling for certain users. Furthermore, as discussed elsewhere, such initial selection of a storage partition for a new or anonymous user may later be changed, such that later interactions will be performed with respect to a different storage partition. After block 320, the routine continues to block 325 to determine an identifier for the selected partition, and stores an indication of the association between the user and the partition identifier for use with later interactions (e.g., as part of a Web cookie for additional interactions as part of an ongoing session with the user, within a lookup table or other mapping, etc.). The routine then continues to block 390 to return an indication of the determined partition identifier so that further handling of the user's request may be performed based on that storage partition (e.g., to be handled by a computing node associated with that storage partition).

If it is instead determined in block 315 that the user is an existing user, the routine continues instead to block 340 to attempt to identify the existing storage partition for the user by retrieving the information from a lookup table or other mapping that associates users with corresponding storage partitions. If it is determined in block 345 that a partition identifier was not identified, such as for a new user that has a user identifier but has not yet performed interactions that involved storing any user-related data, the routine continues to block 320. Otherwise, the routine continues to block 390. After block 390, the routine continues to block 395 to determine whether to continue to identify storage locations for other user requests. If so, the routine returns to block 305, and if not continues to block 399 and ends.

Figure 4:
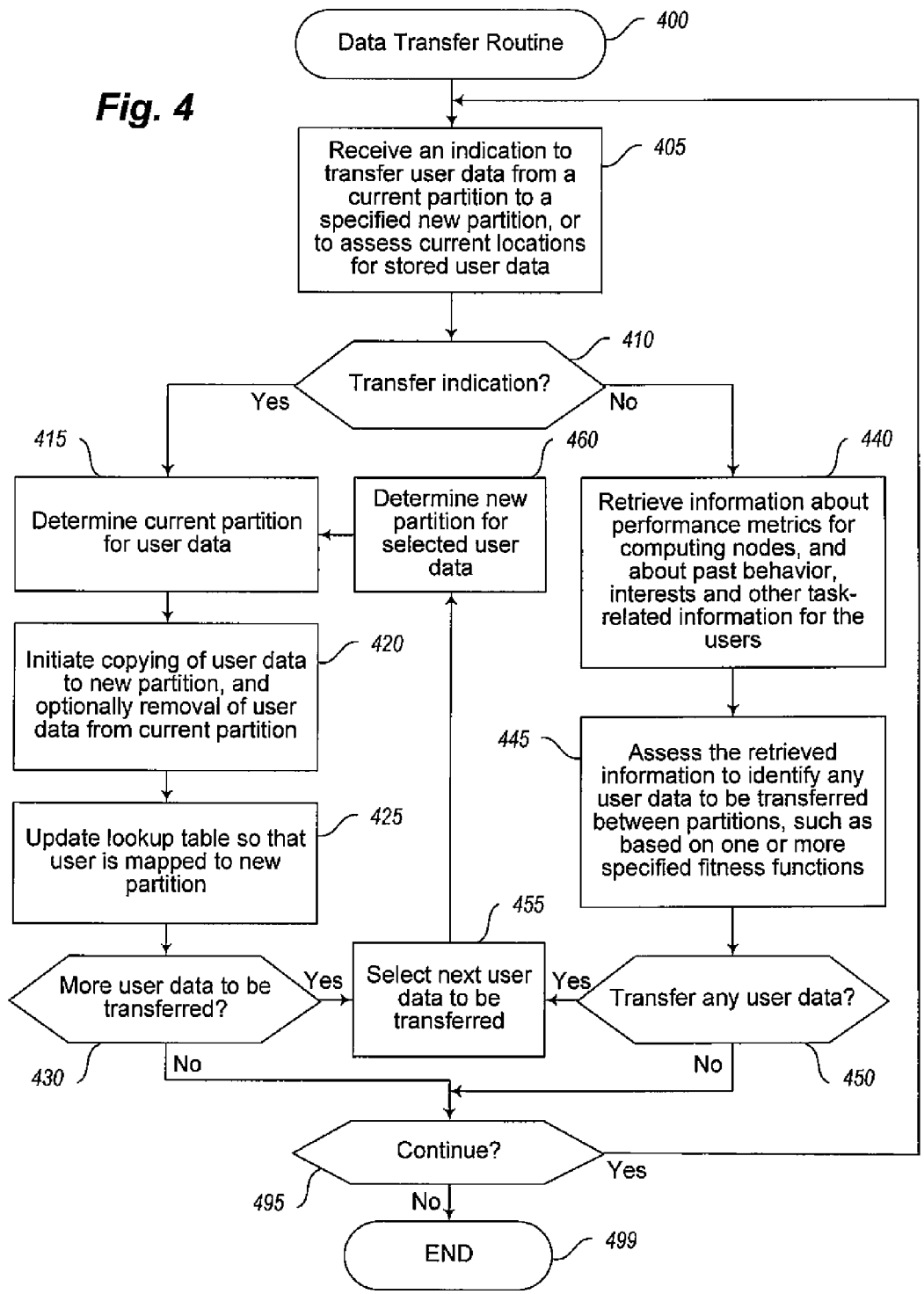
FIG. 4 illustrates a flow diagram of an example embodiment of a Data Transfer routine.

FIG. 4 is a flow diagram of an example embodiment of a Data Transfer routine 400. The routine may be provided by, for example, execution of a data transfer component of the task exchange system 115 of FIG. 1 and/or of the task exchange system interface 240 of FIG. 2, such as to migrate or otherwise transfer data from a current storage partition or other data storage location to a new other storage partition or other data storage location.

The illustrated embodiment of the routine 400 begins at block 405, where an indication is received to transfer one or more groups of user data from a current storage partition to a specified new storage partition, or to assess current storage partition locations that store user data to determine whether to perform any such user data transfers (e.g., based on periodically performing such assessment, or instead as triggered by a change in some factor related to current or new storage partitions). The routine continues to block 410 to determine whether an indication to perform a particular user data transfer was received. If so, the routine continues to block 415 to determine a current storage partition for the user data, selecting a first user data group if multiple user data groups were indicated in block 405. The routine then continues to block 420 to initiate copying of the group of user data to the new storage partition, and to optionally also remove the user data group from the storage partition where it had been stored. In block 425, the routine then updates the lookup table or other mapping to associate the user with the new storage partition, and continues to block 430 to determine whether there are more groups of user data to be transferred. If so, the routine continues to block 455 to select the user group of user data to be transferred, and if not continues to block 495.

If it is instead determined in block 410 that a particular transfer indication was not received, the routine continues to block 440 to retrieve information about current storage partitions and user activities, such as to include performance metrics for computing nodes (e.g., levels of usage of memory, storage, network bandwidth, I/O access, etc.), information about past behavior of users (e.g., in supplying tasks, performing tasks, etc.), information about expected future behavior of users (e.g., in tasks that will be supplied or performed), etc. In block 445, the routine then assesses the retrieved information to identify zero or more groups of user data to be transferred to new storage partitions, such as based on a specified fitness function that weighs multiple factors. As discussed in greater detail elsewhere, such data transfer migrations may be performed for a variety of reasons. The routine then continues to block 450 to determine whether any groups of user data were identified to be transferred. If so, the routine continues to block 455 to select the next group of user data to be transferred, beginning with the first, and if not continues to block 495. After block 455, the routine continues to block 460 to determine the new partition for the currently selected group of user data, such as is specified in block 405 or determined in block 460, and then proceeds to block 415.

In block 495, the routine determines whether to continue to transfer groups of user data. If so, the routine returns to block 405, and if not continues to block 499 and ends.

It will be appreciated that the task exchange system may further have other components that provide a variety of other types of functionality as part of the operation of the task exchange system, but that are not described in detail here.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for facilitating access to data related to tasks, the method comprising:

receiving a request from a first user of a task exchange system that is related to one or more tasks available to be performed via the task exchange system;

in response to the received request, automatically identifying a first partition of the task exchange system that currently stores data related to the first user, the stored data for the first user reflecting prior interactions of the first user with the task exchange system, the first partition being one of multiple alternative partitions of the task exchange system used to store data related to distinct users such that alternative partitions other than the first partition do not currently store the data related to the first user, the automatic identifying of the first partition being performed by one or more configured computing systems of the task exchange system;

using the identified first partition as part of responding to the received request;

after the using of the identified first partition for the received request, transferring the stored data related to the first user to a distinct second partition of the task exchange system;

after the transferring of the stored data to the second partition, receiving another request from the first user that is related to one or more tasks available to be performed via the task exchange system;

in response to the received another request, automatically identifying the second partition as currently storing the data related to the first user, the automatic identifying of the second partition being performed by the one or more configured computing systems of the task exchange system; and using the identified second partition as part of responding to the received another request.

2. The method of claim 1 wherein the transferring of the stored data to the second partition includes updating a stored mapping that associates the first user with the alternative partition that currently stores data related to the first user, and wherein the automatic identifying of the first and second partitions includes retrieving information from the stored mapping related to the first user.

3. The method of claim 2 wherein the stored mapping is part of a lookup table of the task exchange system that maps each of multiple users of the task exchange system with one of the alternative partitions that stores data related to that user.

4. The method of claim 2 wherein the stored mapping associates information specific to the first user with an identifier corresponding to one of the alternative partitions.

5. The method of claim 4 wherein the multiple alternative partitions each correspond to computing resources of one of multiple computing systems used by the task exchange system to store data related to users, and wherein the identifier corresponding to one of the alternative partitions is an identifier for one of the multiple computing systems whose computing resources correspond to the one alternative partition.

6. The method of claim 4 wherein the identifier corresponding to one of the alternative partitions is a logical identifier, wherein the automatic identifying of the first partition further includes resolving the logical identifier to identify the first partition, and wherein the automatic identifying of the second partition further includes resolving the logical identifier to identify the second partition.

7. The method of claim 1 wherein the first user is a task performer user, and wherein the received request from the first user is related to performing one or more tasks supplied by other users.

8. The method of claim 7 wherein the stored data for the first user reflecting prior interactions of the first user with the task exchange system includes data related to other tasks previously performed by the first user via the task exchange system.

9. The method of claim 1 wherein the first user is a task requester user, and wherein the received request from the first user is related to supplying one or more tasks to be performed by other users.

10. The method of claim 9 wherein the stored data for the first user reflecting prior interactions of the first user with the task exchange system includes data related to other tasks previously supplied by the first user for performance by other users via the task exchange system.

11. The method of claim 1 wherein the multiple alternative partitions are each a storage partition provided by one or more of multiple computing nodes associated with the task exchange system.

12. The method of claim 11 wherein each of the storage partitions is provided by a distinct computing node, and wherein at least some of the storage partitions each store data related to multiple users of the task exchange system.

13. The method of claim 11 wherein the multiple computing nodes are each a distinct computing system.

14. The method of claim 1 further comprising, before the transferring of the stored data to the second partition, updating information stored in the identified first partition for the first user to reflect the responding to the received request.

15. The method of claim 1 wherein the transferring of the stored data related to the first user to the second partition includes automatically determining that the second partition is preferred to store the data related to the first user relative to the first partition.

16. The method of claim 15 wherein the automatic determining that the second partition is preferred to store the data related to the first user relative to the first partition includes applying a fitness function to factors related to the first and second partitions.

17. The method of claim 15 wherein the automatic determining that the second partition is preferred to store the data related to the first user relative to the first partition is based at least in part on the second partition storing data related to one or more types of tasks with which the first user is associated.

18. The method of claim 1 further comprising, before the prior interactions of the first user with the task exchange system, automatically initially selecting the first partition to store data related to the first user based on one or more factors at a time of the initial selecting.

19. The method of claim 1 further comprising, before the transferring of the stored data to the second partition:

receiving a request from an anonymous user of the task exchange system that is related to one or more tasks available to be performed via the task exchange system;

automatically identifying a temporary partition of the task exchange system to store data related to interactions with the anonymous user, and storing data in the temporary partition related to the interactions with the anonymous user;

after the storing of the data in the temporary partition, identifying that the anonymous user is the first user; and transferring the stored data in the temporary partition to the first partition so that the transferred data is included as part of the stored data related to the first user, such that the data later transferred from the first partition to the second partition includes the data that was stored in the temporary partition.

20. The method of claim 1 wherein the method is performed by one or more computing systems that provide the task exchange system so as to facilitate transactions between task performer users able to perform tasks and unaffiliated task requesters having multiple available tasks of multiple types to be performed.

21. A non-transitory computer-readable storage medium whose stored contents configure a computing system to facilitate access to data related to tasks, by performing a method comprising:

receiving a request from a first user of a task exchange system that is related to one or more tasks available to be performed via the task exchange system;

in response to the received request, automatically identifying by the configured computing system a first partition of the task exchange system that currently stores data specific to the first user, the stored data including data reflecting prior interactions of the first user with the task exchange system, the first partition being one of multiple alternative partitions of the task exchange system used to store user-specific data for distinct users such that alternative partitions other than the first partition do not currently store the data specific to the first user;

using the identified first partition as part of responding to the received request;

after the using of the identified first partition for the received request, transferring the stored data specific to the first user to a distinct second partition of the task exchange system;

after the transferring of the stored data specific to the first user to the second partition, receiving another request from the first user that is related to one or more tasks available to be performed via the task exchange system;

in response to the received another request, automatically identifying the second partition as currently storing the data specific to the first user; and using the identified second partition as part of responding to the received another request.

22. The non-transitory computer-readable storage medium of claim 21 wherein the transferring of the stored data to the second partition includes updating a stored mapping that associates the first user with the alternative partition that currently stores data specific to the first user, and wherein the automatic identifying of the first and second partitions includes retrieving information from the stored mapping related to the first user.

23. The non-transitory computer-readable storage medium of claim 22 wherein the stored mapping is part of a lookup table of the task exchange system that maps each of multiple users of the task exchange system with one of the alternative partitions that stores data specific to that user.

24. The non-transitory computer-readable storage medium of claim 22 wherein the stored mapping associates information specific to the first user with an identifier corresponding to one of the alternative partitions.

25. The non-transitory computer-readable storage medium of claim 24 wherein the multiple alternative partitions each correspond to computing resources of one of multiple computing systems used by the task exchange system to store user-specific data for distinct users, and wherein the identifier corresponding to one of the alternative partitions is an identifier for one of the multiple computing systems whose computing resources correspond to the one alternative partition.

26. The non-transitory computer-readable storage medium of claim 24 wherein the identifier corresponding to one of the alternative partitions is a logical identifier, wherein the automatic identifying of the first partition further includes resolving the logical identifier to identify the first partition, and wherein the automatic identifying of the second partition further includes resolving the logical identifier to identify the second partition.

27. The non-transitory computer-readable storage medium of claim 21 wherein the first user is a task performer user, the received request from the first user is related to performing one or more tasks supplied by other users, and the data reflecting prior interactions of the first user with the task exchange system includes data related to other tasks previously performed by the first user via the task exchange system.

28. The non-transitory computer-readable storage medium of claim 21 wherein the first user is a task requester user, the received request from the first user is related to supplying one or more tasks to be performed by other users, and the data reflecting prior interactions of the first user with the task exchange system includes data related to other tasks previously supplied by the first user for performance by other users via the task exchange system.

29. The non-transitory computer-readable storage medium of claim 21 wherein the non-transitory computer readable storage medium is a memory of the configured computing system.

30. A computing system, comprising:
one or more processors; and
one or more components configured to, when executed by at least one of the one or more processors, facilitate access to data related to tasks by:
receiving a request from a first user of a task exchange system that is related to one or more tasks available to be performed via the task exchange system;

in response to the received request, automatically identifying a first partition of the task exchange system that currently stores data specific to the first user, the stored data for the first user reflecting prior interactions of the first user with the task exchange system, the first partition being one of multiple alternative partitions of the task exchange system used to store data specific to distinct users such that alternative partitions other than the first partition do not currently store the data specific to the first user;

using the identified first partition as part of responding to the received request;

after the using of the identified first partition for the received request, transferring the stored data specific to the first user to a distinct second partition of the task exchange system;

after the transferring of the stored data to the second partition, receiving another request from the first user that is related to one or more tasks available to be performed via the task exchange system;

in response to the received another request, automatically identifying the second partition as currently storing the data specific to the first user; and using the identified second partition as part of responding to the received another request.

31. The computing system of claim 30 wherein the multiple alternative partitions are each a storage partition provided by one or more of multiple computing nodes associated with the task exchange system.

32. The computing system of claim 31 wherein each of the storage partitions is provided by a distinct computing node, and wherein at least some of the storage partitions each store data specific to multiple users of the task exchange system.

33. The computing system of claim 31 wherein the multiple computing nodes are each a distinct computing system.

34. The computing system of claim 30 wherein the one or more components are further configured to, before the transferring of the stored data to the second partition, updating information stored in the identified first partition for the first user to reflect the responding to the received request.

35. The computing system of claim 30 wherein the transferring of the stored data specific to the first user to the second partition includes automatically determining that the second partition is preferred to store the data specific to the first user relative to the first partition.

36. The computing system of claim 35 wherein the automatic determining that the second partition is preferred to store the data specific to the first user relative to the first partition includes applying a fitness function to factors related to the first and second partitions.

37. The computing system of claim 35 wherein the automatic determining that the second partition is preferred to store the data specific to the first user relative to the first partition is based at least in part on the second partition storing data related to one or more types of tasks with which the first user is associated.

38. The computing system of claim 30 wherein the one or more components are further configured to, before the prior interactions of the first user with the task exchange system, automatically initially selecting the first partition to store data specific to the first user based on one or more factors at a time of the initial selecting.

39. The computing system of claim 30 wherein the one or more components are further configured to, before the transferring of the stored data to the second partition:

receiving a request from an anonymous user of the task exchange system that is related to one or more tasks available to be performed via the task exchange system;
automatically identifying a temporary partition of the task exchange system to store data related to interactions with the anonymous user, and storing data in the temporary partition related to the interactions with the anonymous user;
after the storing of the data in the temporary partition, identifying that the anonymous user is the first user; and
transferring the stored data in the temporary partition to the first partition so that the transferred data is included as part of the stored data specific to the first user, such that the data later transferred from the first partition to the second partition includes the data that was stored in the temporary partition.

* * * * *